United States Patent [19]

(12) United States Patent
Pearlman et al.

(10) Patent No.: US 10,104,080 B2
(45) Date of Patent: *Oct. 16, 2018

(54) SELECTIVE CONTENT ACCESSIBILITY IN A SOCIAL NETWORK

(75) Inventors: Leah Pearlman, Denver, CA (US); Alok Menghrajani, Sunnyvale, CA (US); Mark Slee, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 13/619,968

(22) Filed: Sep. 14, 2012

(65) Prior Publication Data

US 2013/0019319 A1    Jan. 17, 2013

Related U.S. Application Data

(63) Continuation of application No. 12/485,856, filed on Jun. 16, 2009.

(51) Int. Cl.
*G06Q 10/00* (2012.01)
*H04L 29/06* (2006.01)
(Continued)

(52) U.S. Cl.
CPC .............. *H04L 63/10* (2013.01); *G06Q 50/01* (2013.01); *H04L 12/185* (2013.01); *H04L 51/32* (2013.01);
(Continued)

(58) Field of Classification Search
CPC ...................................................... G06Q 50/01
See application file for complete search history.

(56) References Cited

U.S. PATENT DOCUMENTS 5,751,281 A      5/1998   Hoddie et al.
5,751,287 A  *   5/1998   Hahn ................... G06F 3/0481
                                                   715/775
(Continued)

FOREIGN PATENT DOCUMENTS

JP     H04-84587 A     3/1992
JP     H05-167613 A    7/1993
(Continued)

OTHER PUBLICATIONS

State Intellectual Property Office of the People's Republic of China, First Office Action, Chinese Patent Application No. 201080026200. 4, dated Feb. 4, 2013, twenty pages.
(Continued)

*Primary Examiner* — Gabrielle A McCormick
(74) *Attorney, Agent, or Firm* — Fenwick & West LLP

(57) ABSTRACT

A social networking service encourages users to post content to a communication channel with varying levels of accessibility to other users. Users may select how content will be published and control the accessibility of uploaded content using a privacy setting for each content item that the user posts. The privacy setting defines, or identifies, the set of connections who may view the posted content item. The posted content item is placed in a particular communication channel in the social networking service, such as a newsfeed or stream, where the content item can be viewed by those who are permitted to view it according to its associated privacy setting. Varying granularities of privacy settings provide flexibility for content accessibility on a social networking service.

27 Claims, 12 Drawing Sheets

(51) Int. Cl.
*H04L 29/08* (2006.01)
*G06Q 50/00* (2012.01)
*H04L 12/58* (2006.01)
*H04L 12/18* (2006.01)

(52) U.S. Cl.
CPC .......... *H04L 63/104* (2013.01); *H04L 67/06* (2013.01); *H04L 67/22* (2013.01); *H04L 67/306* (2013.01)

(56) References Cited

U.S. PATENT DOCUMENTS

| | | | |
|---|---|---|---|
| 8,566,328 B2* | 10/2013 | Tseng | G06F 17/30575 707/661 |
| 2005/0268346 A1* | 12/2005 | Lee | G06F 21/10 726/27 |
| 2008/0104679 A1 | 5/2008 | Craig | |
| 2008/0134294 A1* | 6/2008 | Mattox | G06F 21/6245 726/4 |
| 2009/0070334 A1* | 3/2009 | Callahan | G06F 21/604 |
| 2009/0077062 A1 | 3/2009 | Spivack et al. | |
| 2009/0125521 A1 | 5/2009 | Petty | |
| 2009/0328135 A1* | 12/2009 | Szabo | G06F 21/6245 726/1 |
| 2010/0280965 A1 | 11/2010 | Vesterinen et al. | |

FOREIGN PATENT DOCUMENTS

| | | |
|---|---|---|
| JP | 2007-052557 A | 3/2007 |
| JP | 2008-539660 A | 11/2008 |

OTHER PUBLICATIONS

European Patent Office, European Search Report and Opinion, European Patent Application No. 10789961.9, dated Nov. 20, 2013, four pages.
United States Office Action, U.S. Appl. No. 12/485,856, dated Dec. 30, 2013, twenty-three pages.
Japanese Patent Office, Office Action, Japanese Patent Application No. 2012-516135, dated May 20, 2014, eight pages.
Nagata, S. et al., "Enzin: A Communication Tool with Instant Access Control," *Report of Institute of Information Processing's Research, Institute of Information Processing*, Mar. 15, 2007, pp. 1134-1143, vol. 48, No. 3 [with English abstract].
State Intellectual Property Office of the People's Republic of China, Second Office Action, Chinese Patent Application No. 201080026200.4, dated Feb. 12, 2014, twenty pages.
Takai, K. et al., "ACS: A Social Networking System for Various Human Relations," *Report of Institute of Information Processing's Research, Institute of Information Processing*, Jul. 15, 2007, pp. 2328-2339, vol. 48, No. 7 [with English abstract].
Canadian Intellectual Property Office, Office Action, Canadian Patent Application No. 2,761,348, dated Jan. 29, 2015, five pages.
Fujita, K., "Office Manager Mail and Scheduler Operating in a Unique Window Environment," *Nikkei Byte*, Nov. 1, 1991, pp. 226-229, Issue 92, Nikkei Business Publications, Inc.
Hall, N., "Will you be my friend?" *The Gazette*, Jun. 9, 2007, Montreal, Quebec. [Online] [Retrieved Jul. 14, 2015] Retrieved from the Internet <URL: https://www.lexis.com/research/retrieve?cc=&pushme=1&tmpFBSel=all&totaldocs=&taggedDocs=&toggleValue=&numDocsChked=0&prefFBSel=0&delformat=XCITE&fpDocs=&fpNodeId=&fpCiteReq=&expNewLead=0&fpSetup=0&brand=ldc&dedupeOption=1&_m=07cc3764d7a50198d9b07f5e6d629349&docnum=1&_fmtstr=FULL&_startdoc=1&wchp=dGLbVzB-zSkAl&_md5=a6e5c3851b8ff0e22982a91ce9d18ebb&focBudTerms=facebook+&focBudSel=all.>.
Japan Patent Office, Office Action, Japanese Patent Application No. 2012-516135, dated Jan. 6, 2015, five pages.
State Intellectual Property Office of the People's Republic of China, Third Office Action, Chinese Patent Application No. 201080026200.4, dated Oct. 10, 2014, twenty pages.
State Intellectual Property Office of the People's Republic of China, Rejection Decision, Chinese Patent Application No. 201080026200.4, dated Apr. 27, 2015, twenty pages.
Stone, B. et al., "Facebook Backtracks on Use Terms," New York Times, Feb. 19, 2009, two pages.
United States Office Action, U.S. Appl. No. 12/485,856, dated Mar. 5, 2015, eight pages.
United States Office Action, U.S. Appl. No. 12/485,856, dated Aug. 13, 2014, five pages.
Australian Government, IP Australian, Patent Examination Report No. 1, Australian Patent Application No. 2014203777, dated Feb. 8, 2016, three pages.
Canadian Intellectual Property Office, Office Action, Canadian Patent Application No. 2,761,348, dated Dec. 2, 2015, five pages.
European Patent Office, Examination Report, European Patent Application No. 10789961.9, dated Dec. 22, 2015, five pages.
State Intellectual Property Office of the People's Republic of China, Patent Reexamination Board, Notification of Reexamination, Chinese Patent Application No. 201080026200.4, dated Feb. 19, 2016, twenty pages.
Australian Government, IP Australian, Patent Examination Report No. 2, Australian Patent Application No. 2014203777, dated Oct. 14, 2016, three pages.
Australian Government, IP Australia, Examination report No. 1 for standard patent application, Australian Patent Application No. 2017200728, dated Nov. 16, 2017, three pages.
United States Office Action, U.S. Appl. No. 14/550,870, dated Nov. 29, 2017, sixteen pages.
European Patent Office, Summons to attend oral proceedings pursuant to Rule 115(1) EPC, European Patent Application No. 10789961.9, Jul. 18, 2018, eleven pages.

\* cited by examiner

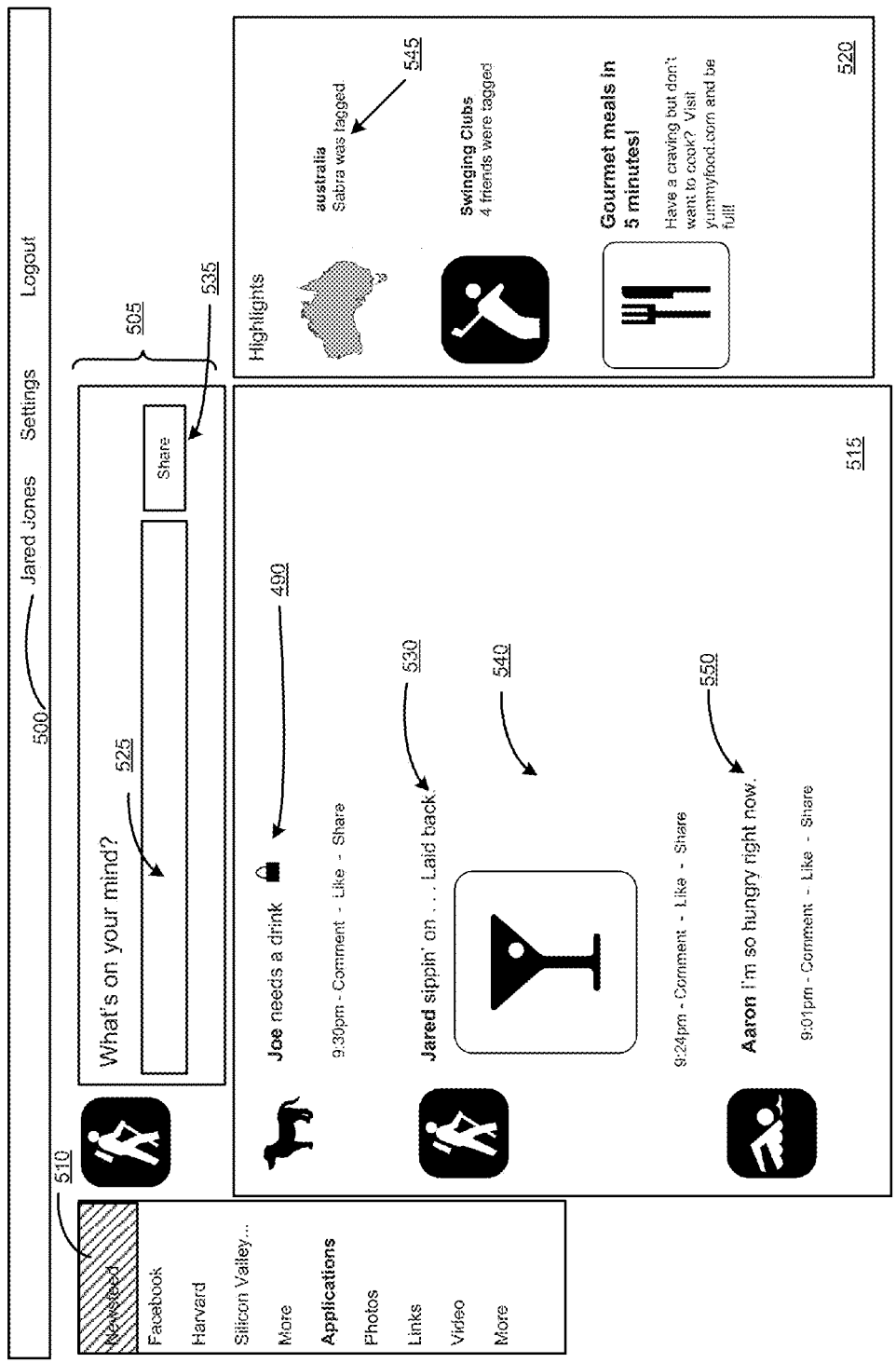

SELECTIVE CONTENT ACCESSIBILITY IN A SOCIAL NETWORK

CROSS-REFERENCE TO RELATED APPLICATIONS

This application is a continuation of U.S. patent application Ser. No. 12/485,856, filed Jun. 16, 2009, the content of which is hereby incorporated by reference in its entirety.

BACKGROUND

The present invention relates generally to social network services, and more particularly to providing users of a social network service the ability to selectively designate content with varying levels of accessibility. As used herein, a "user" can be an individual or an entity (such as a business or third party application). The term "connection" refers individuals and entities with which a user of the social networking service may form a connection, association, or relationship.

Conventionally, users of social networking services can post content that they wish to enable and/or encourage others to view. The content may include text, status updates, location information, photos, videos, groups, events, and links to external websites as well as other pages in the social network, just to name a few. Content posted by a user is then made available to the user's connections via one or more of various communication channels in the social network, such as a newsfeed or stream.

While the streams in a social network efficiently make content available to a user's connections, the user cannot control the accessibility of the posted content on a granular level. As a user becomes connected with more and more people on the social network over time, the user may wish to target certain content to a subset of his or her connections, or may wish to specifically exclude certain connections from viewing the uploaded content entirely. In addition, a user may not want to inundate all of the user's connections with numerous content items that may be irrelevant to many of them. Conventional social networking services lack a content upload and delivery mechanism that enables users to control the accessibility of the content generated on the social network on a granular level. As a result, users are reluctant to upload certain content to the social network freely because of the lack of granular control of the accessibility of that content.

SUMMARY

To encourage users to post content to a social network, embodiments of the invention allow users to select how content will be published and to control the accessibility of the uploaded content. In one embodiment, a user may select a privacy setting for each content item that the user posts. The privacy setting defines, or identifies, the set of connections that may view the posted content item. The posted content item is placed in a particular communication channel in the social network, such as a newsfeed or stream, where the content item can be viewed by connection permitted to view it according to its associated privacy setting. In this way, a user may have tremendous flexibility in who will be able to view the user's posted content.

The privacy setting may be specified on various levels of granularity, such as by specifying particular connections in the social network, predefined groups of the user's connections, a particular genre of connections, all of the user's connections, all connections of the user's connections, the entire social network, or even the entire Internet (e.g., to make the posted content item indexable and searchable on the Internet). A user may choose a default privacy setting for all content that is to be posted. Additionally, a user may specifically exclude certain connections from viewing a content item or a particular type of content.

In one embodiment, a user may edit the privacy setting of a content item after it has been posted. In this manner, a user may confine the accessibility of content to connections selected by the user even after the content has been posted to the communication channel in the social network.

BRIEF DESCRIPTION OF THE DRAWINGS

FIG. 5 is a screenshot depicting how a post appears in a connection's newsfeed in accordance with one embodiment of the invention.

Figure 1:
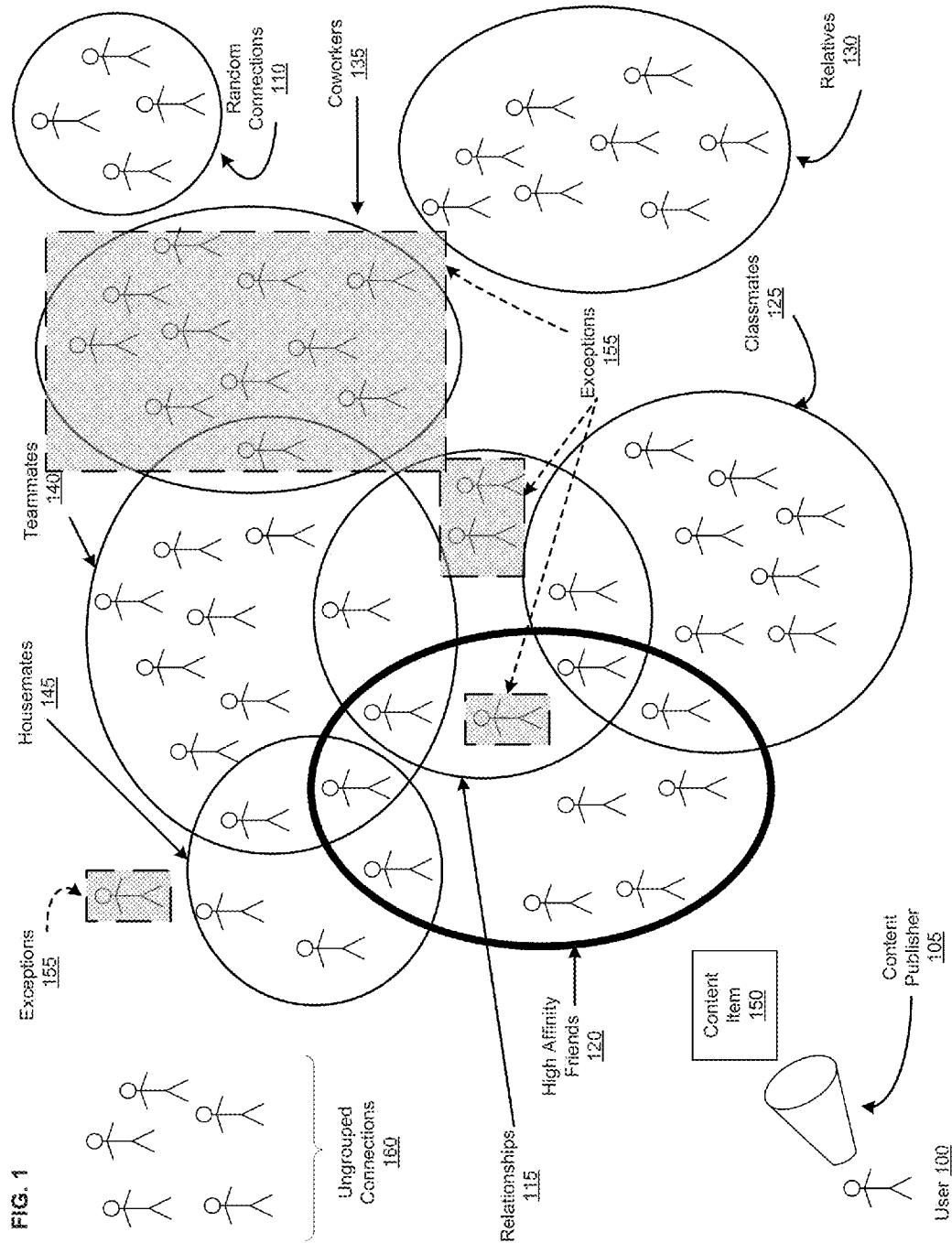
FIG. 1 is a high-level conceptual diagram illustrating a user and the various groups, or subsets of connections on a social network in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking service offers its users the ability to communicate and interact with other users of the social network. In use, users join the social network and then establish connections to other users, individuals and entities, to whom they desire to be connected. Connections may be added explicitly by a user, for example, the user selecting a particular other user to be a friend, or automatically created by the social networking site based on common characteristics of the users (e.g., users who are alumni of the same educational institution). Connections in social networks are usually in both directions, but need not be. For example, if Bob and Joe are both users and establish a connection with one another, Bob and Joe have a two-way connection. If, on the other hand, Bob wishes to connect to Sam to view Sam's posted content items, but Sam does not choose to connect to Bob, a one-way connection is formed. The connection between users may be a direct connection; however, some embodiments of a social networking service allow the connection to be indirect via one or more levels of connections.

In addition to interactions with other users, the social networking service provides users with the ability to take actions on various types of items supported by the service. These items may include groups or networks (where "networks" here refer not to physical communication networks, but rather social networks of people) to which users of the service may belong, events or calendar entries in which a user might be interested, computer-based applications that a user may use via the service, transactions that allow users to buy or sell items via the service, and interactions with advertisements that a user may perform on or off the social network. These are just a few examples of the items upon which a user may act on a social networking service, and many others are possible. Though many of the embodiments/examples provided below are directed to a social networking service, the invention described herein is not limited to a social networking service, but can include other environments involving social networks, social content, or other types of websites.

User generated content enhances the user experience on the social networking service. "Content" may include any type of media content, such as status updates or other textual messages, location information, photos, videos, advertisements, and links. Content "items" represent pieces of content that are represented as objects in the social network. In this way, users of a social network are encouraged to communicate with each other by "posting" content items of various types of media through various communication channels. Using communication channels, users of a social network increase their interaction with each other and engage with the social network on a more frequent basis. One type of communication channel is a "stream" in which a user is presented with a series of content items that are posted, uploaded, or otherwise provided to the social networking service from one or more users of the service. The stream may be updated as content items are added to the stream by users. Communication channels are discussed further in U.S. patent application Ser. No. 12/253,149, filed on Oct. 16, 2008, which hereby incorporated by reference in its entirety.

However, there are instances where posting content visible to all of a user's connections is not desirable. For example, a user may want to post a video from a company presentation to the social network. This video may not be appropriate to be shared with all of the user's connections, for example, those connections working at competing companies. Thus, the user may want to confine the accessibility of the video to a select audience. Conventional social networking services fail to provide a mechanism for users to post content while also controlling the accessibility and targeting of user generated content.

In one embodiment, a social network enables a user to modify how content items are shared in a social network. Content items may have a designated privacy setting. A privacy setting defines the set of users who may view or access the content posted in the communication channel. The privacy setting may be specified on various levels of granularity, and a user may specifically exclude certain connections from viewing a content item. Once a user customizes a privacy setting, that custom setting may be saved for subsequent content item postings, in one embodiment.

These settings may be modified for each content item a user uploads at the time of the upload, allowing tremendous flexibility in controlling the accessibility of posted content. Alternatively, a user may choose a default privacy setting for all uploaded content. A privacy setting thus enables a user to hide specific content items from certain connections, or to target specific content items to a particular audience, focusing content delivery to identified individual or groups of connections chosen by the user. A connection not identified by a privacy setting will be blocked from viewing or otherwise accessing the content item. Privacy settings are also described more generally in U.S. patent application Ser. No. 12/154,886, filed on May 27, 2008, which is hereby incorporated by reference in its entirety. In one embodiment, a user may edit the privacy setting of a content item after it has been posted. In this manner, a user may confine the accessibility of content to an audience selected by the user even after the content has been posted to the communication channel in the social network, in one embodiment. In another embodiment, the accessibility of some content may not be edited after it has been posted to a communication channel.

A user may have many different types of connections on a social network. For example, FIG. 1 shows how, in one embodiment, a user's connections in a social network may be classified by the type of connection shared in real life. A user may expressly designate a name for certain groups of connections created by the user or for an automatic grouping that may be generated by the social network according to common characteristics shared by the connections and the user. Such automatic groupings may include co-workers, housemates, teammates, classmates, travel companions, relationships, relatives, random connections, or any other grouping the social network can determine from information entered or the actions taken by users on the social networking service. This information may also include profile information entered by the users as well as actions performed on the social networking service, in one embodiment. For example, if a user speaks French and English and wants to post a content item in French, an automatic grouping of all French speakers may be created so that the user may post the French content for connections that actually understand French, in one embodiment. Thus, an automatic grouping may also be created on the basis of language skills, or any other common interests or characteristics as shared in the profile information of the users or can otherwise be determined by the system.

The system may also, in an alternative embodiment, include a category of connections that include friends for which a high affinity is associated with the user. Having a high affinity for a user indicates a high level of interaction and engagement with the user and the user's posts. Thus, a user may wish to post content for viewing by connections that might actually engage with or interact with the content as opposed to connections that would ignore the post. A user may also create his or her own grouping. Other groupings may include network-level privacy, such as geographic networks and alumni networks as entered in the user's profile information. A grouping or classification of a connection, therefore, is simply a designation for organizing a set of the user's connections. Affinities are described further in U.S. application Ser. No. 11/503,093, filed Aug. 11, 2006, which is hereby incorporated by reference in its entirety.

As depicted in FIG. 1, a user 100 has several groupings of connections. The groupings may overlap and a connection may have more than one classification. Random connections 110 may comprise of connections that the user met randomly, in real life or on the social networking service. Relationships 115 may include real life relationships or other relationships existing on the social networking service. High affinity friends 120 may vary at any given time, but these connections have indicated a high affinity for the user according to their interactions with the user, the user's posted content, or shared content, in one embodiment. Classmates 125 may include connections that attended the same school as the user. Relatives 130, coworkers 135, teammates 140, and housemates 145 may represent groupings of actual relatives, coworkers, teammates, and housemates, however a real-life connection is optional.

Exceptions 155 may be designated by a user ad hoc, meaning that the user can designate which connections are blocked from viewing specific content items as each content item is posted. In other words, each time a user posts a content item, the user may exclude a specific connection from accessing that content item at the time of the posting. In an alternative embodiment, exceptions 155 may also include connections that have been excluded from all content posts. Exceptions 155 may include individual connections or entire groupings. For example, a user may wish to exclude coworkers 135 from viewing family photos, but not from viewing photos from a sporting event. Using a content publisher 105, the user 100 may designate the family photos (a content item 150) with different privacy settings from the sporting event photos (another content item 150). Thus, the user 100 can share personal photos (a content item 150) with her high affinity friends 120 or any other grouping of friends, while at the same time making sure that her coworkers 135 and other specified exceptions 155 don't even know about these personal photos.

In another embodiment, a content item may be associated with various data items. For example, a photo of a secret surfing spot may be tagged to indicate that several connections appear in the photo, and a location of where the photo was taken may also be attached to the photo using GPS or other location awareness enabled applications. In this example, the content item comprises the photo of the secret surfing spot, but is also attached to data items including links to the connections appearing in the photo and location information identifying where the photo was taken. A user posting this photo may wish to share the photo content with everyone on the social networking service, but at the same time hide, or exclude, the location information from a subset of connections. A different subset of connections may be allowed to view the location information as well as the photo content according to the user's privacy setting. Further, data items may also include metadata, or information about the content item. This metadata may include, for example, the number of times the photo has been viewed and other interactions with the photo, such as sharing the photo or posting the photo to a connection's wall, or posting content as a comment. Thus, one content item, such as the photo of the secret surfing spot, may be associated with various data items, including location information, social content, and photo content, each with different privacy settings.

It should be noted that a connection need not be grouped. FIG. 1 illustrates several ungrouped connections 160 that have not been designated a group by the user 100 or by an automatic grouping.

System Architecture

Figure 2:
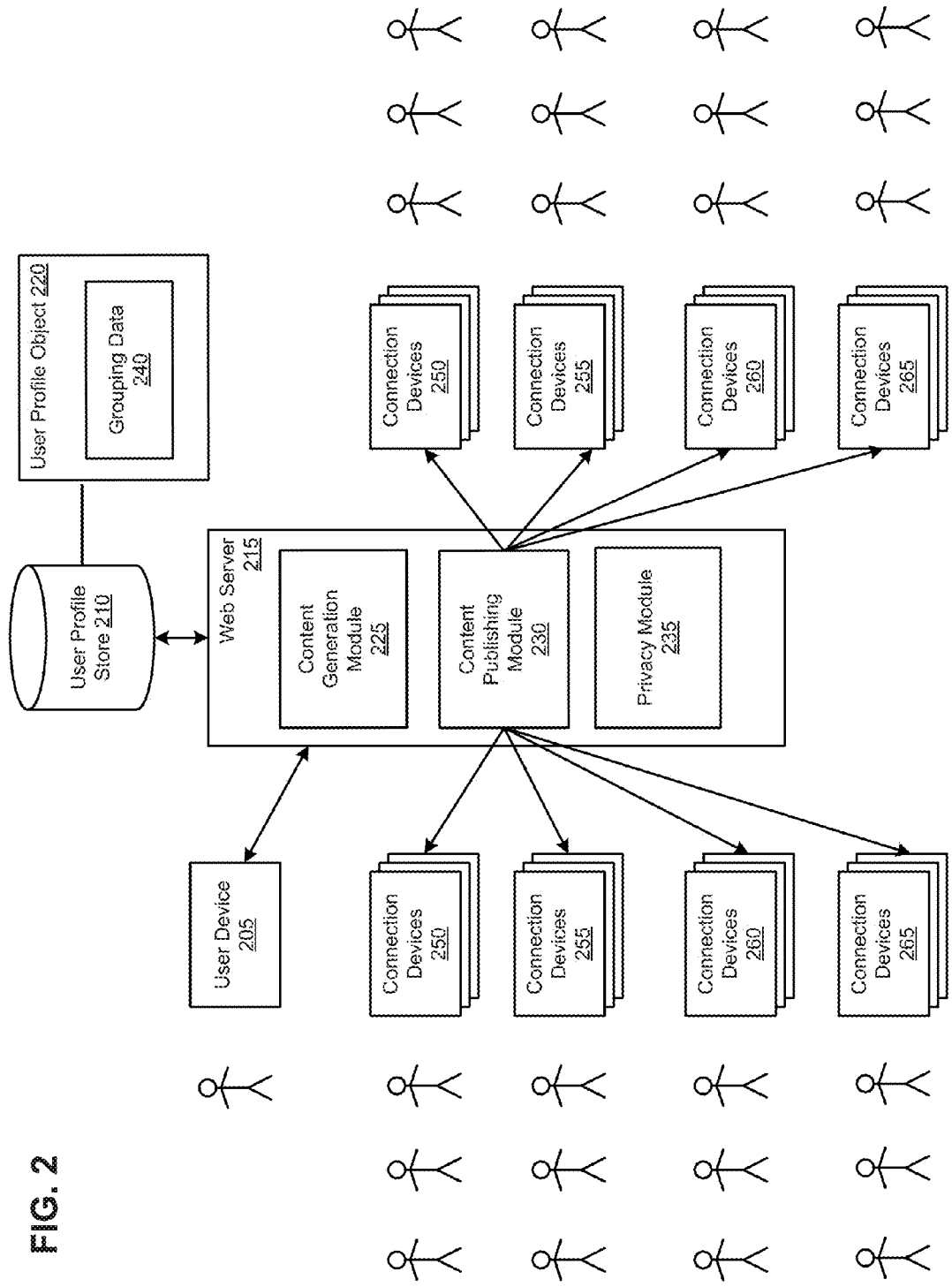
FIG. 2 is a high-level block diagram of a system for controlling content accessibility in a social network in accordance with an embodiment of the invention.

FIG. 2, in one embodiment, depicts a high-level block diagram of the system architecture involved in controlling the accessibility of content posted on the social networking service. A user device 205 may include any device that allows a user of a social networking service to interact with other users of the social networking service. The user device 205 communicates with the web server 215 to send and receive data. A user device 205 may request from the web server 215 a web page comprising content items. While accessing the web page, a user may post content to the social networking service via the user device 205 by uploading content. A user profile store 210 communicates with the web server 215 to provide access to a user profile object 220 for each user of the social networking service. The user profile object 220 provides access to grouping data 240 for each user of the social networking service that can be used to generate automatic groupings of connections. The grouping data 240 also comprises user-defined groupings of connections, in one embodiment. In other embodiments, a user device 205 interfaces directly with a web server 215 to upload and receive content items. In another embodiment, the social networking service is implemented on an application running on a client device (e.g., a portable communications device) that accesses information from the social networking service using APIs or other communication mechanisms.

The web server 215 comprises a content generation module 225, a content publishing module 230, and a privacy module 235. The content generation module 225 receives the content item uploaded by a user and generates an object on the social networking service associated with the uploaded content item. The content publishing module 230 provides an interface for the user to select a privacy setting for the uploaded content item. This interface determines the content item's accessibility on the social networking service.

The content publishing module 230 also retrieves grouping data 240 from the user profile object 220 associated with the user uploading the content via the user device 205. Using the grouping data 240, the content publishing module 230 displays selectable groupings to the user. Groupings may vary in granularity, such as by specifying particular individual connections in the social networking service, predefined groups of the user's connections, a particular genre of connections, all of the user's connections, all connections of the user's connections, all users of the social networking service, or even the entire Internet (e.g., to make the posted content item indexable and searchable on the Internet). Additionally, a user may specifically exclude certain connections from viewing a content item using the content publishing module 230. Alternatively, a user may choose a default privacy setting for all content that is posted, and this default setting would be stored as a preference on the user's profile object 220.

The privacy module 235 provides an interface for a user to modify the privacy setting of a content item after it has been posted in the communication channel. For example, suppose a user's default setting allows all users of the social networking service to view the all of the user's posted content. After posting a certain content item, the user may decide to limit access to the posted content item to a particular subset of connections by modifying the privacy setting of the content item via the privacy module 235. In this manner, a content item's privacy setting can be changed easily, limiting the content's accessibility to the connections selected by the user. The privacy module 235 enables the accessibility of a content item posted by a user to be modified by the user at any time.

Connection devices 250, 255, 260, and 265 represent different devices used by groups of connections made up of individuals, entities, or both. The content publishing module 230 delivers a content item to the communication channel and configures the accessibility of the content by the connection devices 250, 255, 260, and 265 according to the selected groupings stored as grouping data 240. For example, connection devices 250 may relate to devices used by a user's relatives, while connection devices 255, 260, and 265 may relate to devices used by a user's classmates, coworkers, and relationships. Depending on how the user has configured the privacy setting for a content item posted to a communication channel, the connection devices 250, 255, 260, and 265 may or may not be able to view the posted content item.

Selective Content Accessibility

Figure 3A:
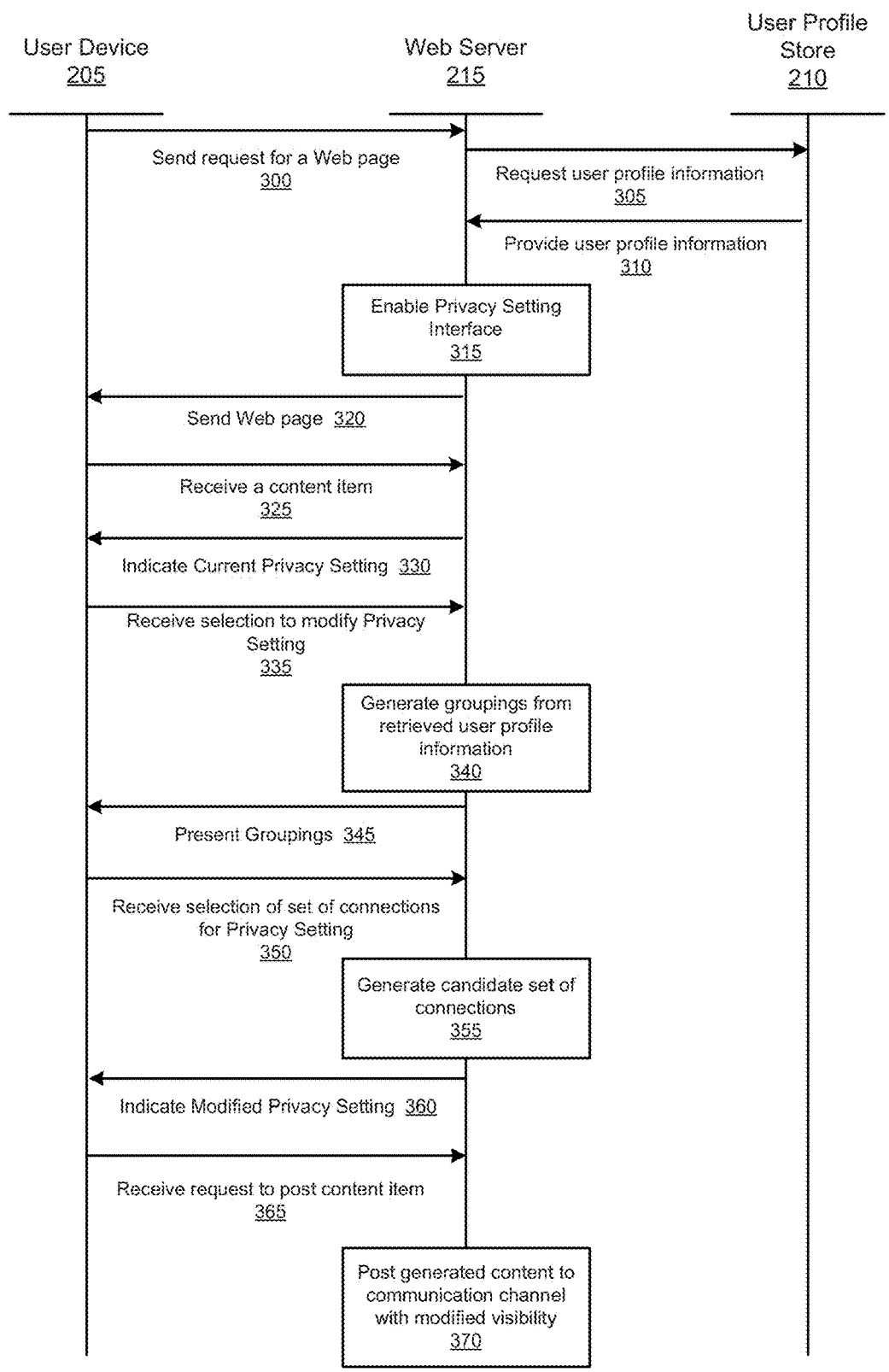
FIGS. 3A-B are interaction diagrams of a process for designating a privacy setting to a content item in accordance with an embodiment of the invention.

FIG. 3A is an interaction diagram showing how a user may select the level of accessibility of a content item that the user posts. A user device 205 sends 300 a request for a web page to the web server 215. The web server 215 requests 305 user profile information from the user profile store 210. The user profile store 210 provides 310 the requested user's profile information. The web server 215 then enables 315 a privacy setting interface loaded with the user's profile information. As discussed earlier, a user's profile information is stored as a user profile object 220 comprising, among other things, grouping data 240.

The web server 215 sends a web page 320 to the user device 205. The web server 215 receives 325 a content item from the user device 205. At this point, the privacy setting interface indicates 330 the current privacy setting. A user may be satisfied with the current privacy setting and decide to request 365 the web server 215 to post the content item with the current privacy setting. In one embodiment, the current privacy setting may be the most recently used privacy setting. In another embodiment, the current privacy setting is the default setting as specified in the user's profile object 220.

A user may also decide to modify the privacy setting, the web server 215 receiving 335 a selection to modify the privacy setting. The web server 215 generates 340 groupings from the retrieved user profile information. These groupings can be selected and unselected by the user after they have been presented 345 to the user. A user may also decide to specifically exclude connections from the candidate set of connections, as well as specifically include additional connections. Once the web server 215 has received 350 a selection of a set of connections for the privacy setting, a candidate set of connections is generated 355.

The web server 215 indicates 360 on the web page that the privacy setting has been modified. At this point, the user may change his or her mind and select 335 to modify the privacy setting again. Otherwise, a request is received 365 to post the content item. This content will be posted 370 by the web server 215 to the communication channel with modified accessibility as specified in the privacy setting. In one embodiment, the user may later modify the privacy setting for the content item.

Figure 3B:
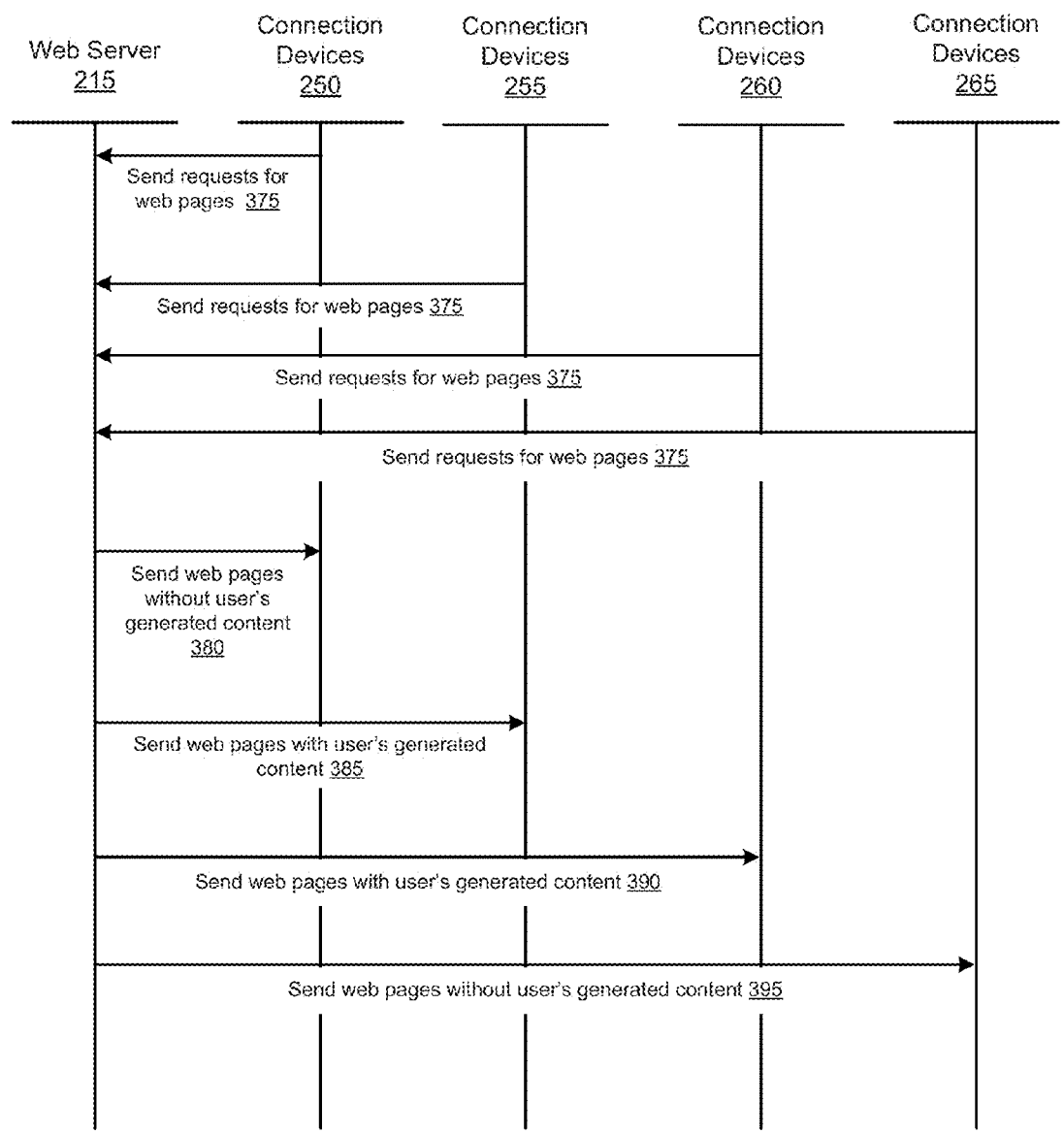

FIG. 3B illustrates how content items posted in a communication channel are delivered from a web server 215 to connection devices 250, 255, 260, and 265. As requests for web pages are sent 375 from the different groups of connection devices 250, 255, 260, and 265 to the web server 215, a web page is sent that may or may not comprise the posted content because of the privacy setting selected by the user. As a result, the group of connection devices 250 may be sent 380 web pages without the user's generated content because the group of connection devices 250 may correspond to connections that were excluded from viewing the content, such as relatives for example. Another group of connection devices 265 may also be sent 395 web pages without the user's generated content because they may correspond to specifically excluded connections that the user did not want to allow to access the posted content item. Selected connections corresponding to connection devices 255 and 260, however, will receive web pages with the user's generated content sent 390 and 395 from the web server 215. In other embodiments, connection devices 250, 255, 260, and 265 interface directly with a web server 215 to receive content items. In another embodiment, the social networking service is implemented on an application running on a client device (e.g., a portable communications device) that accesses information from the social networking service using APIs or other communication mechanisms.

Figure 4A:
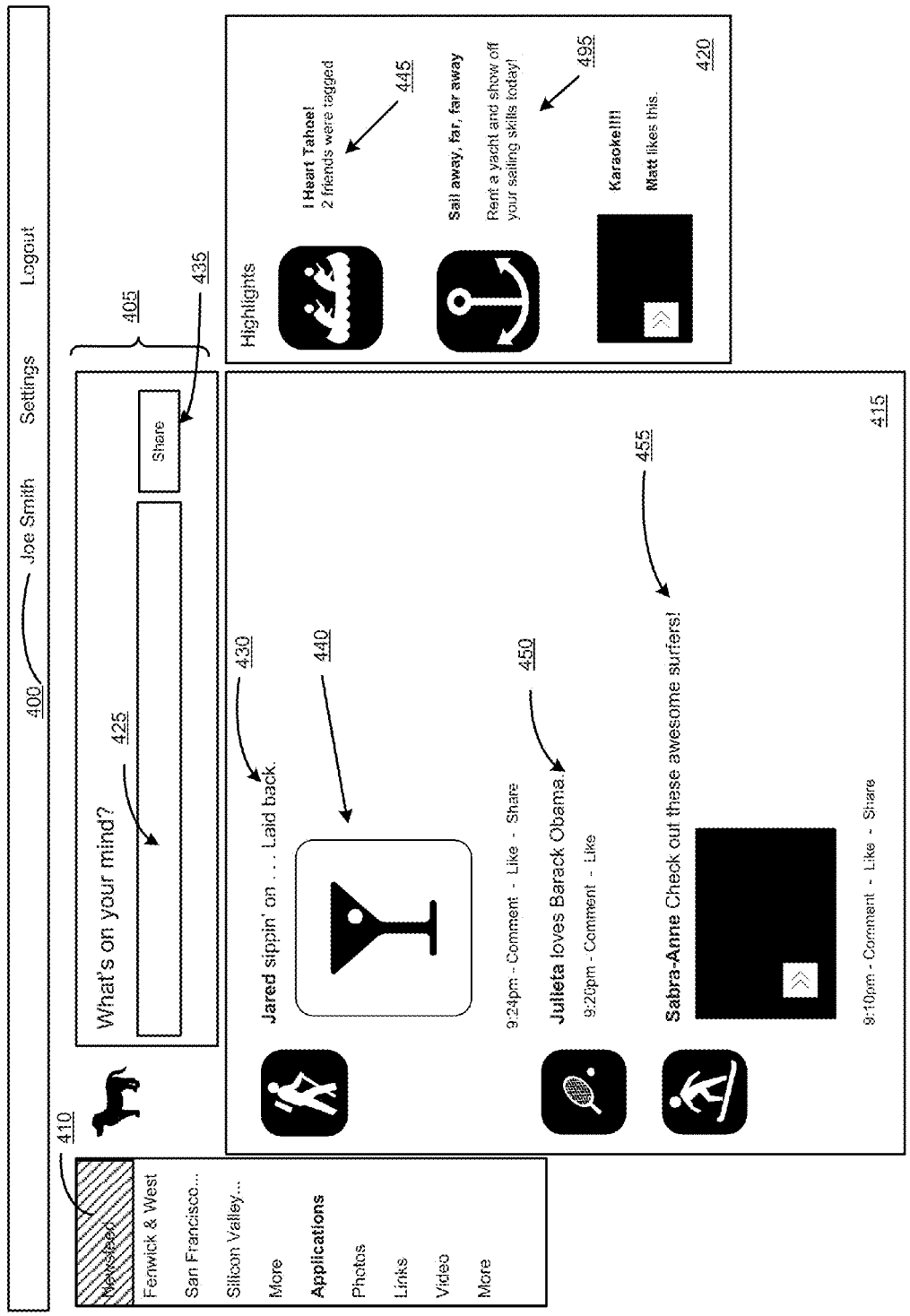
FIGS. 4A-G are screenshots depicting one embodiment of the invention, illustrating how content accessibility is controlled in a social network.

FIGS. 4A-G are screenshots of one embodiment of the invention. FIG. 4A displays a typical web page sent by a web server 215. The title bar 400 indicates that "Joe Smith" is the user of the social networking service associated with this particular web page. A communication channel 415 displays content items posted by the user's connections in the social networking service. A posting interface 405 enables the user to upload and post content to a communication channel 415 in the social networking service for view by other users of the social networking service. A filtering interface 410 enables the user to filter the content of the displayed communication channel 415. Another communications channel 420 displays "Highlights" to the user that might be of interest to the user. Both communication channels 415 and 420 may comprise content items generated by users on the social networking service.

Within the posting interface 405, an input field 425 and content submission button 435 are displayed. The communication channel 415 comprises content items posted by users and entities on the social networking service. For example, a connection posted a photo 440 with an accompanying caption 430. Another connection posted a status update 450 in the communication channel 415. Yet another connection posted a video 455 with an accompanying caption. And still other entities (whether connections or not) might post an advertisement 495 to the communication channel 415, or, as illustrated in FIGS. 4A-G, in the communication channel 420. In the "Highlights" communication channel 420, a link to a photo album 445 is also displayed.

Figure 4B:
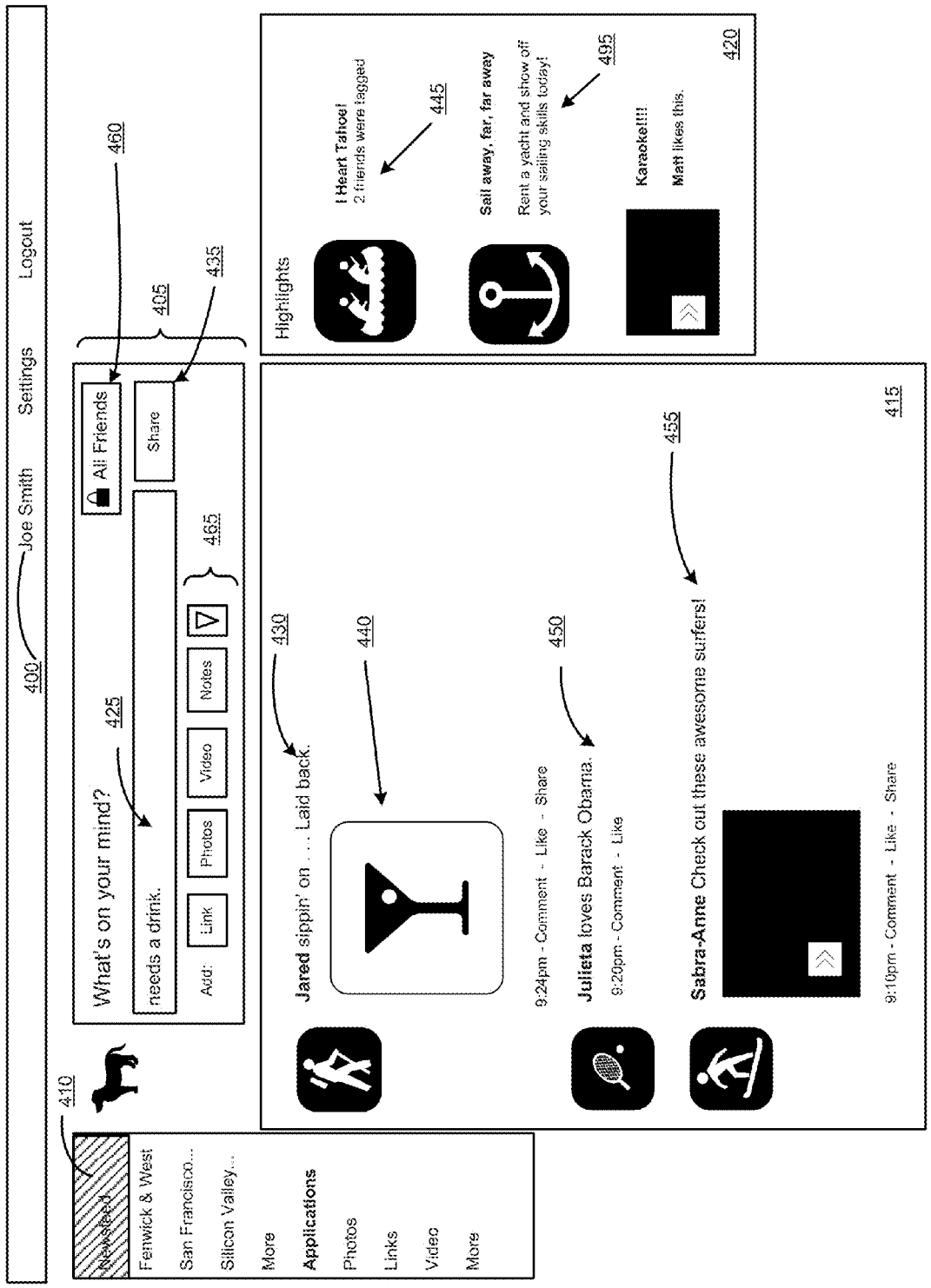

In FIG. 4B, content has been uploaded into the input field 425. The posting interface 405 is modified to include various links 465 to upload different types of content such as links, photos, videos, and notes. Other applications may be included in a drop down menu link 465 represented in FIG. 4B by an inverted triangle. A privacy setting dialog 460 also appears within the posting interface 405 that indicates the current privacy setting. As illustrated in FIG. 4B, the current privacy setting is set to "All Friends."

Figure 4C:
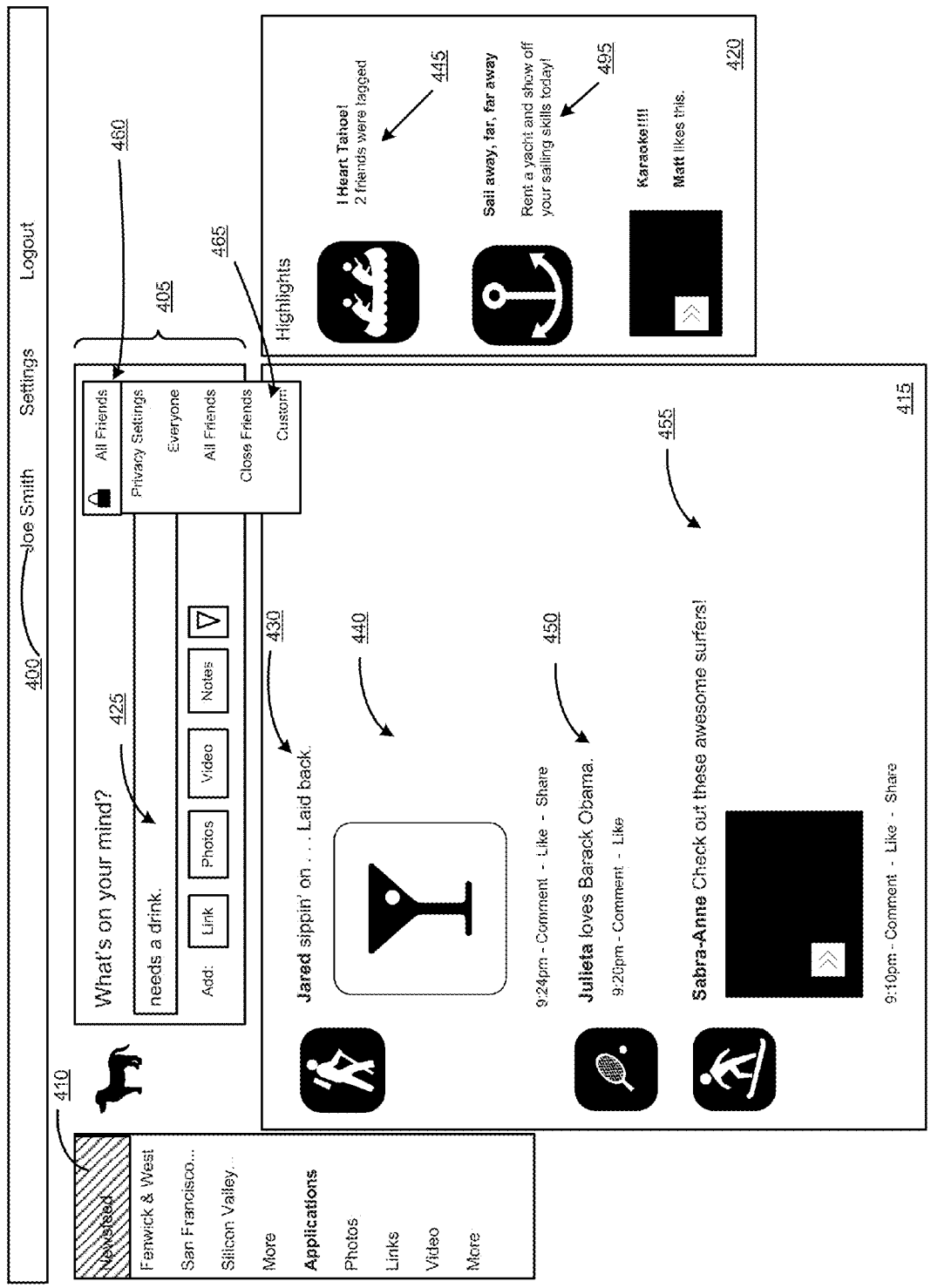

In FIG. 4C, the privacy setting dialog 460 has been selected to be modified. In one embodiment, a drop down menu lists several types of privacy settings, including "Everyone," "All Friends," "Close Friends," and "Custom." The "Everyone" setting may include all users of the social networking service and may also include anyone on the Internet, making the uploaded content indexable and searchable by anyone on the Internet. The "All Friends" setting may include all of the user's connections on the social networking service. The "Close Friends" setting may, in one embodiment, include connections on the social networking service that have a high affinity score for the user. This means that these connections are interested in the posts from that user due to the regular interaction with the user, the user's posted content, or the shared content on the social networking service. The user determines a "Custom" setting at that moment. In another embodiment, the most recently used "Custom" setting is stored in the user profile object associated with the user. In yet another embodiment, choosing the "Custom" setting allows the user to choose among custom groups previously created by the user.

Figure 4D:
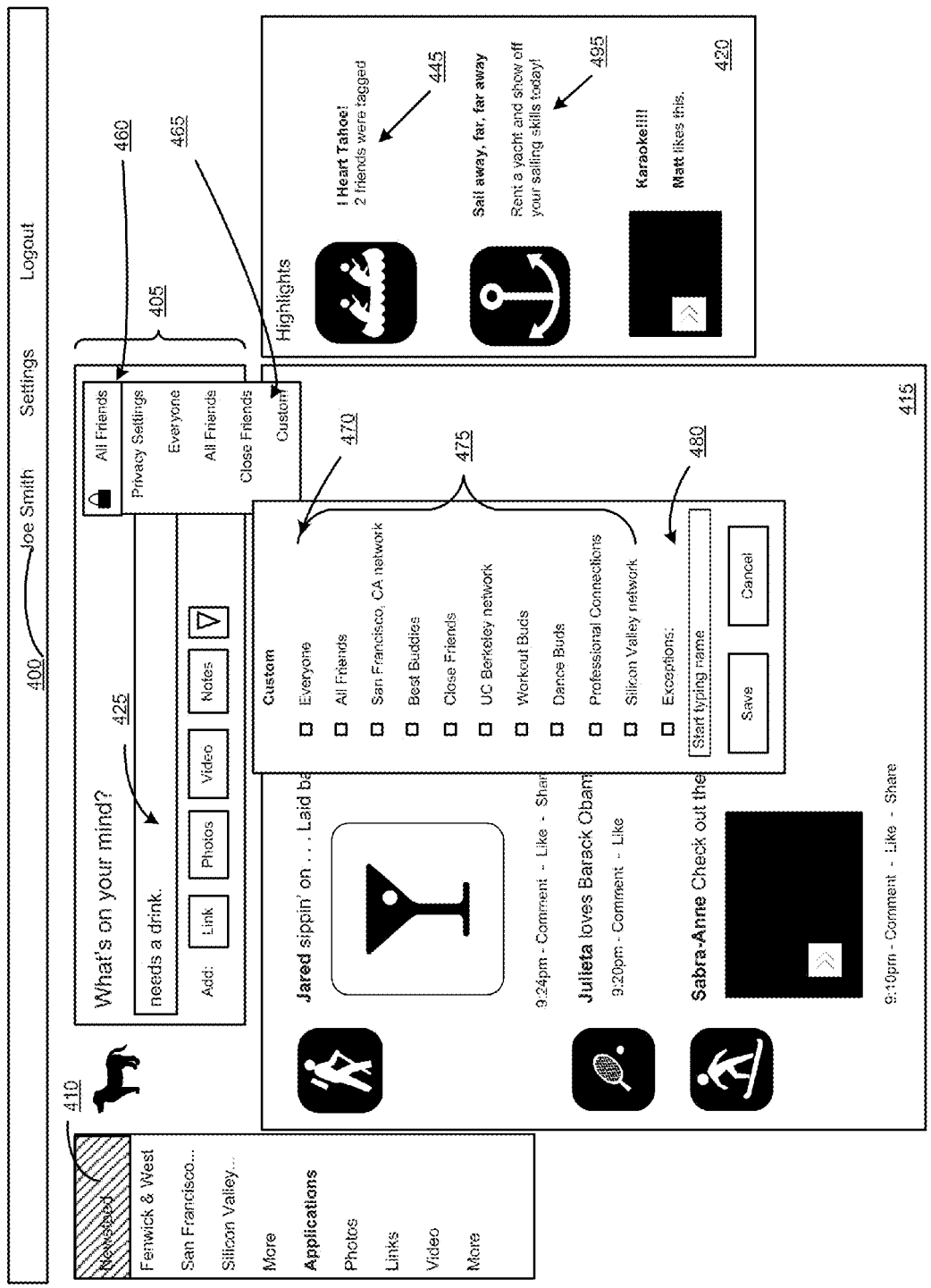
Figure 4E:
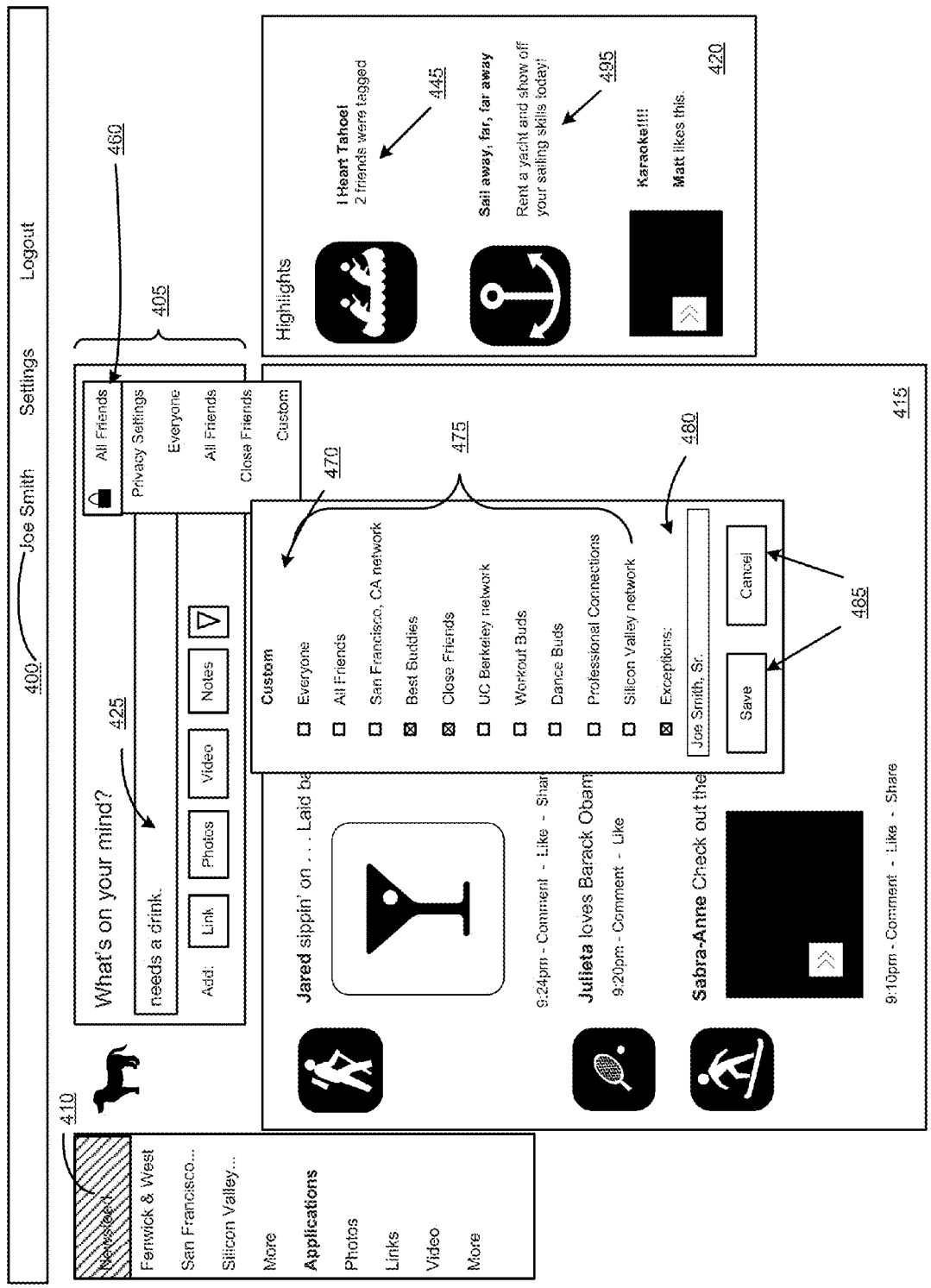

Once a user decides to customize the accessibility of the content to be uploaded by selecting the "Custom" setting 465 from the privacy setting dialog 460, a custom privacy setting dialog box 470 pops up as displayed in FIG. 4D. A list 475 of groupings with checkboxes is displayed within the custom privacy setting dialog box 470. In another embodiment, the custom privacy setting dialog box includes an ability to add a new list, or grouping, of connections. In addition, exceptions 480 may be entered into a text field to specify connections to exclude from viewing the content item being posted. As seen in FIG. 4E, two groupings have been selected, "Best Buddies" and "Close Friends" and one exception has been made, "Joe Smith, Sr." The user may either save or cancel 485 the custom privacy setting.

Figure 4F:
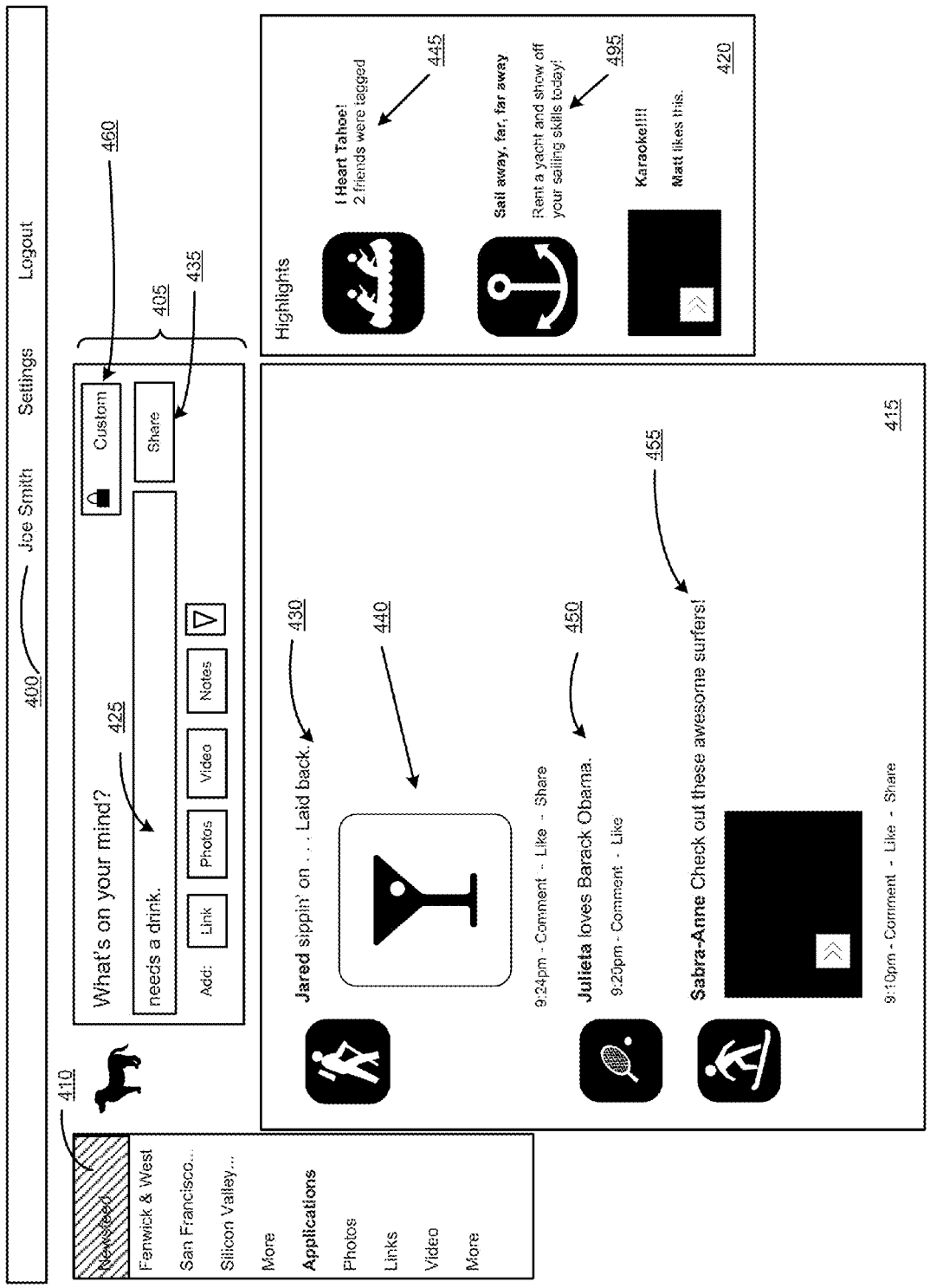
Figure 4G:
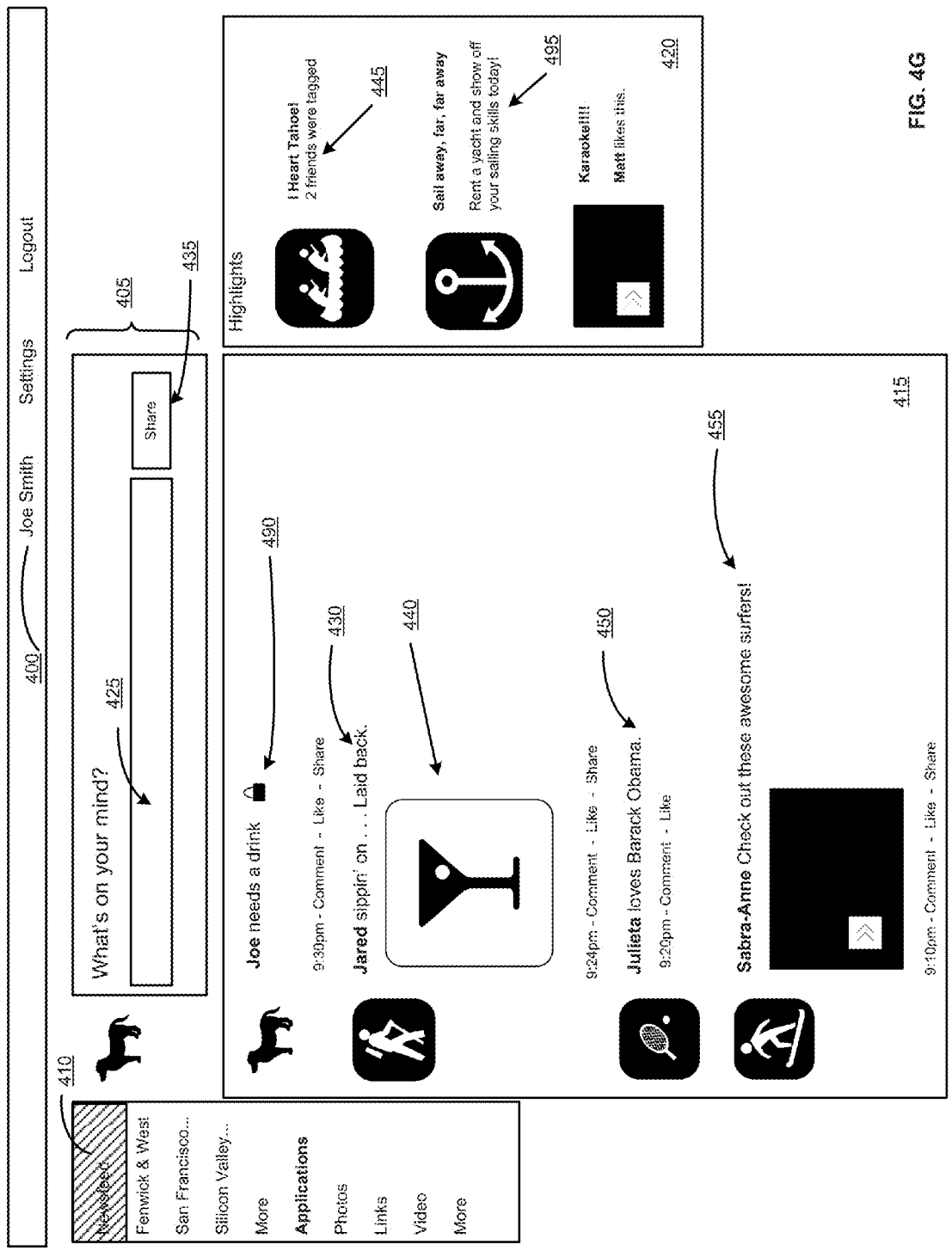

After saving the custom privacy setting, the privacy setting dialog 460 indicates that a "Custom" setting is in use, as shown in FIG. 4F. Of course, other displays may be used to indicate the custom privacy setting as a matter of design choice. The content item in the example is a status update uploaded in the text field 425, stating that the user "needs a drink." To post this status update, the user must select the content submission button 435. After selecting the content submission button 435, the status update 490 appears in the communication channel 415. The status update 490 also has a lock symbol that indicates that the content has a modified privacy setting. In one embodiment, the lock symbol is only visible to the user posting the content with the modified privacy setting.

FIG. 5 is a screenshot of a typical web page of a connection of the user in FIGS. 4A-G. The title bar 500 indicates that this web page is associated with the user "Jared Jones." Similar to FIG. 4A, a communication channel 515 displays content items posted by the user's connections in the social networking service. A posting interface 505 enables the user to upload and post content to a communication channel 515 in the social networking service for view by other users of the social networking service. A filtering interface 510 enables the user to filter the content of the displayed communication channel 515. Another communications channel 520 displays "Highlights" to the user that might be of interest to the user. Both communication channels 515 and 520 may comprise content items generated users on the social networking service.

Within the posting interface 505, a text input field 525 and content submission button 535 are displayed. The communication channel 515 comprises content items posted by users of the social networking service. For example, the user "Jared" posted a photo 540 with an accompanying caption 530. Another connection posted a status update 550 in the communication channel 515. In the "Highlights" communication channel 520, a link to a photo album 545 is displayed.

However, in the communication channel 515, the status update 490 posted by "Joe" appears. This is because "Jared Jones" was included in one of the groupings selected by Joe in the custom privacy setting dialog box 470. The status update 490 has a lock icon next to it because it has a privacy setting narrower than "Everyone."

Implications of Selective Content Accessibility

As a result of selective content accessibility, communication channels on the social networking service may comprise more relevant content items because users may direct the content they post in a more targeted manner. Further, users may be more willing to post content items to communication channels because of the increased control over the accessibility of the content by others. A posting "etiquette" may emerge on the social networking service, meaning that users will be empowered to focus and target the delivery of their content items to an audience of connections that may find the content items relevant and appropriate.

As content items become searchable, or indexable, users will retain complete control over who may view their content on a per object basis. In one embodiment, the privacy settings for content items will be persistent and remain with the content item. Thus, "per object privacy" provides tremendous flexibility and control to users of the social networking service.

Content items may also include actions taken by users that are delivered to communication channels on the social networking service. For example, a user who rents a movie on a third party website may authorize a story to be posted in a communication channel on the social networking service. The story communicates an interest of the user, but the user may wish to modify the privacy setting of the story to inform only his best friends that he enjoyed a particular movie. Other actions taken by a user, such as interactions with an advertisement or making a new connection on the social networking service, may be converted into a story that is a content item posted to a communication channel with an associated privacy setting. Users may modify the privacy settings of these content items as well, thus selectively controlling the accessibility of any creation of content on the social networking service.

Unlike conventional social networking services that require users to opt into a community of interest to consume relevant content, the combination of various communication channels and content accessibility control using privacy settings enables users of a social networking service to digest highly relevant content without the burden of seeking out or opting into a formally defined group. To the contrary, per object privacy encourages users to be more open in posting content to communication channels while also targeting shared content to tremendously flexible user-defined groups of connections in the social networking service.

Furthermore, as new communication channels are implemented on the social networking service, per object privacy will help to streamline and insure the privacy of user generated content posted into these communication channels.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a processor, one or more content items provided via an interface from a user of a social networking service;
receiving, by the processor, a selection of a privacy setting to be associated with each of the content items from the user provided via the interface, the privacy setting identifying a group of one or more other users of the social networking service allowed to view each of the content items;
providing each of the content items in an electronic communication channel of the social networking service for viewing to one of a group of one or more other users of the social networking service according to the privacy setting selected by the user for each of the content items, the electronic communication channel presenting a series of content items including each of the content items and at least one other content item posted by another user;
receiving a modification to the privacy setting of a particular content item from the user after the particular content item has been provided in the electronic communication channel, wherein the modification after the particular content item has been provided produces a modified group of other users;
receiving a comment to the particular content item from a particular user in the modified group of other users, wherein the particular content item is provided to the particular user with an indicator indicating that the particular content item has a modified privacy setting;
associating the comment with the modified privacy settings; and responsive to associating the comment with the modified privacy settings, providing at least one user in the modified group with access to the comment.

2. The method of claim 1, wherein the group is a customized group designated by the user.

3. The method of claim 1, further comprising:
providing a menu from which the user can select predefined groups of other users of the social networking service or connections of the user.

4. The method of claim 1, wherein the group is selected from a social networking service grouping that groups users according to common characteristics of users in the group.

5. The method of claim 1, further comprising providing a setting for a user to choose among a plurality of custom groups previously created by the user for different privacy settings.

6. The method of claim 1, wherein the privacy setting is customized by the user, and further comprising saving the customized privacy setting for subsequent content item postings.

7. The method of claim 6, further comprising:
detecting that a customized privacy setting is in use and that the customized privacy setting applies to a new content item provided; and
applying the customized privacy setting to the new content item to control what group can view the new content item.

8. The method of claim 1, wherein the group is a group of co-workers, housemates, teammates, classmates, travel companions, relationships, relatives, or random connections.

9. The method of claim 1, wherein the group is a group of connections for which the user has a high affinity.

10. The method of claim 1, wherein the group is a customized group created by the user having common characteristics designated by the user.

11. The method of claim 1, wherein the group is a network-level group.

12. The method of claim 1, further comprising:
blocking viewing of one of the content items for other users of the social networking service not identified by the privacy setting.

13. The method of claim 1, further comprising:
responsive to receiving a selection of a privacy setting to be associated with each of the content items that prevents a given content item from being posted to a communication channel accessible to one or more connections, omitting the given content item from the communication channel accessible to the one or more connections.

14. The method of claim 13, wherein the selection is dynamically selected based on the user's affinity for the one or more connections.

15. The method of claim 1, further comprising:
sending, by a processor, the interface for display to the user, the interface configured to allow the user to provide content items and a selection of privacy settings for each content item provided via the interface.

16. The method of claim 1, wherein the privacy setting defines a group of connections allowed to view the content item and specifies one or more connections in the group of connections to exclude from being allowed to view the content item.

17. The method of claim 1, further comprising:
sending the content items for display to one or more other users of the social networking service who are allowed to view the content item, and providing a user interface with the displayed content item for indicating the privacy setting that was selected for each of the displayed content items.

18. The method of claim 1, further comprising:
providing a user interface for receiving the selection of the privacy setting, the user interface setting as a default a privacy setting that was most recently selected by the user for another content item.

19. The method of claim 1, wherein the one or more other users of the social networking service comprise one or more connections of the user in the social networking service.

20. A computer system comprising:
a user profile store for storing profiles of users of a social networking service, each profile comprising grouping data of the profile's connections; and
a web server comprising:
a processor,
a content generation module, implemented by the processor, for receiving one or more content items from a user of the social networking service each with an associated privacy setting identifying a group of one or more other users of the social networking service allowed to view each of the content items,
a content publishing module, implemented by the processor, for providing each of the content items in an electronic communication channel of the social networking service and publishing each of the content items to the group of one or more other users of the social networking service via the electronic communication channel, the electronic communication channel presenting a series of content items including each of the content items and at least one other content item posted by another user, wherein each of the content items is published subject to the privacy setting associated with each of the content items, and
a privacy module, implemented by the processor, for managing ability to view each of the content items and for receiving a modification to the privacy setting of a particular content item from the user after the particular content item has been provided in the electronic communication channel, wherein the modification after the particular content item has been provided produces a modified group of other users,
wherein the content publishing module is further configured for receiving a comment to the particular content item from a particular user in the modified group of other users, the particular user in the modified group of other users being provided with the particular content item with an indicator indicating that the particular content item has a modified privacy setting,
wherein the privacy module is further configured for associating the comment with the modified privacy settings thereby providing at least one user in the modified group with access to the comment.

21. The system of claim 20, wherein the one or more other users of the social networking service comprise one or more connections of the user in the social networking service.

22. A computer-implemented method comprising:
maintaining in a profile database a set of user profiles for users of a social networking service and a set of connections among the user profiles;
providing, by a processor, an interface for users of the social networking service configured to allow users to provide content items and a selection of privacy settings for each of the content items provided via the interface that identify a group of one or more other users of the social networking service allowed to view each of the content items;
maintaining in a content database a plurality of received content items and associated privacy settings from users providing content items via the interface;
for each of one or more of the users of the social networking service, generating a stream of content items for the user limited according to the privacy settings and identified group associated therewith;
providing the streams of content items to users of the social networking service in an electronic communication channel presenting a series of content items including each of the content items and at least one other content item posted by another user via a computer display;
receiving modifications to the selection of privacy settings from the users for particular content items after the particular content items have been provided in the electronic communication channel, wherein the modifications after the particular content items have been provided produce modified groups of other users;
receiving a comment to one of the particular content items from a particular user in the modified group of other users, wherein the one of the particular content items is provided to the particular user with an indicator indicating that the particular content item has a modified privacy setting;
associating the comment with the modified privacy setting; and
responsive to associating the comment with the modified privacy setting, providing at least one user in the modified group with access to the comment.

23. The method of claim 22, further comprising maintaining groupings of user profiles for users of the social networking service according to common characteristics of the user profiles and wherein the privacy settings are specified by selecting one or more of the groupings via the interface.

24. The method of claim 22, further comprising maintaining user-defined groupings of user profiles for users of the social networking service and wherein the privacy settings are specified by selecting one or more of the user-defined groupings via the interface.

25. The method of claim 22, wherein the privacy settings are specified by selecting one or more users that are blocked from viewing the content items associated with a particular privacy settings.

26. The method of claim 22, the group being designated by the user or selected from social networking service groups, and the group having a group name provided by the user.

27. The method of claim 22, wherein the one or more other users of the social networking service comprise one or more connections of the user in the social networking service.

* * * * *